United States Patent
Zhang et al.

(10) Patent No.: US 8,700,095 B2
(45) Date of Patent: Apr. 15, 2014

(54) MANAGEMENT METHOD AND APPARATUSES

(75) Inventors: Yi Zhang, Beijing (CN); Christian Markwart, Munich (DE); Shun Liang Zhang, Beijing (CN); Wei Hua Zhou, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 13/516,586

(22) PCT Filed: Dec. 18, 2009

(86) PCT No.: PCT/CN2009/001496
§ 371 (c)(1),
(2), (4) Date: Jul. 23, 2012

(87) PCT Pub. No.: WO2011/072429
PCT Pub. Date: Jun. 23, 2011

(65) Prior Publication Data
US 2012/0282900 A1    Nov. 8, 2012

(51) Int. Cl.
*H04M 1/00*    (2006.01)
*H04B 1/38*    (2006.01)
*H04M 11/00*    (2006.01)

(52) U.S. Cl.
USPC .......................................... 455/561; 455/403

(58) Field of Classification Search
USPC .......................................... 455/403, 411, 561
See application file for complete search history.

(56) References Cited

U.S. PATENT DOCUMENTS

| 7,990,912 B2 * | 8/2011 | Nix et al. .................. 370/328 |
| 2005/0117554 A1 | 6/2005 | Bleckert et al. |

(Continued)

FOREIGN PATENT DOCUMENTS

| CN | 1625908 A | 6/2005 |
| WO | WO 02/17665 A1 | 2/2002 |
| WO | WO 2009/106790 A1 | 9/2009 |

OTHER PUBLICATIONS

3GPPS 2.220 V9.1.1, "3rd Generation Partnership Project; Technical Specification Group Services and System Aspects; Service Requirements for Home NodeBs and Home eNodeBs (Release 9)", Jun. 2009, pp. 1-22.

(Continued)

*Primary Examiner* — Nathan Mitchell
(74) *Attorney, Agent, or Firm* — Squire Sanders (US) LLP (57) ABSTRACT

After a successful authentication in a femto system, a home base station management system is used to send configuration data to a home base station and manage the home base station over a secured management connection. The configuration data stored in the management system is classified into two types: a) Device-related configuration data, which are indexed by a device ID; and b) subscriber/user-related configuration data, which are indexed by a subscriber ID. The management system sets up a binding relationship between device ID of the home base station and the subscriber/user identity of the USIM/SIM installed in the home base station. Then the management system generates full configuration data for the home base station based on the combination of the binded IDs. In other words, the full configuration data contains device-related configuration data selected from the classified configuration data based on the binded device ID, and user-related configuration data selected from the classified configuration data based on the binded subscriber/user ID. The management system then sends this full configuration data to the home base station.

16 Claims, 3 Drawing Sheets

(56) References Cited

U.S. PATENT DOCUMENTS

| | | | |
|---|---|---|---|
| 2008/0220779 A1* | 9/2008 | Bose | 455/436 |
| 2009/0047945 A1* | 2/2009 | Zhang et al. | 455/424 |
| 2009/0061924 A1* | 3/2009 | Morrill et al. | 455/552.1 |
| 2009/0129349 A1* | 5/2009 | Osborn | 370/338 |
| 2009/0286512 A1* | 11/2009 | Huber et al. | 455/411 |
| 2010/0016022 A1* | 1/2010 | Liu et al. | 455/561 |
| 2010/0304712 A1* | 12/2010 | Sweeney et al. | 455/410 |
| 2011/0124361 A1* | 5/2011 | Hosono et al. | 455/509 |
| 2011/0207461 A1* | 8/2011 | Lundqvist et al. | 455/436 |
| 2011/0292890 A1* | 12/2011 | Kulkarni et al. | 370/329 |
| 2012/0028629 A1* | 2/2012 | Liu et al. | 455/422.1 |
| 2012/0208504 A1* | 8/2012 | Song et al. | 455/411 |
| 2012/0252423 A1* | 10/2012 | Brisebois et al. | 455/418 |
| 2012/0264418 A1* | 10/2012 | Lee et al. | 455/422.1 |

OTHER PUBLICATIONS

3GPP TS 33.320 V1.0.0, "3rd Generation Partnership Project; Technical Specification Group Services and System Aspects; 3GPP Security Aspect of Home NodeB and Home eNodeB; Release 9", Sep. 2009, pp. 1-29.

3GPP TS 32.583 V9.0.0, "3rd Generation Partnership Project; Technical Specification Group Services and System Aspects; Telecommunication Management; Home Node B (HNB) Operations, Administration, Maintenance and Provisioning (OAM&P); Procedure Flows for Type 1 Interface HNB to HNB Management System (HMS) (Release 9)", Jun. 2009, pp. 1-21.

3GPPS TS 32.593 V1.0.0, "3rd Generation Partnership Project; Technical Specification Group Services and System Aspects; Telecommunication Management; Home eNode B (HeNB) Operations, Administration, Maintenance and Provisioning (OAM&P); Procedure Flows for Type 1 Interface HeNB to HeNB Management System (Release 9)", Sep. 2009, pp. 1-19.

International Search Report and Written Opinion corresponding to International Patent Application No. PCT/CN2009/001496, dated Sep. 23, 2010.

* cited by examiner

MANAGEMENT METHOD AND APPARATUSES

FIELD OF THE INVENTION

The present invention relates to management of access points connected to a mobile network, and to management of femtocell access points.

BACKGROUND OF THE INVENTION

With increasing demand of broadband and wireless broadband traffic (e.g. multimedia, video) over Internet, home and office users are fast be-coming important target customers for wireless operators and solution providers. The devices typically are installed to the customers' premises by the customers themselves. The customers' existing broadband internet connections (such as DSL or cable) may be used as backhaul connections to the service provider's network and the devices are powered from the customers' electricity sockets.

As the femtocells are installed indoors they will allow service providers to extend service coverage indoors, especially where access would otherwise be limited or unavailable. People living in rural areas can use them in to gain better coverage. Femtocells will also give some additional network capacity due to the small cell size and reduce the load of the macrocells. On the other hand they will also use the same radio resources as macrocells and interfere the macro layer as any other base stations. There are also numerous other challenges in implementing an efficient solution.

The femtocell incorporates the functionality of a typical base station but extends it to allow a simpler, self contained deployment. An example is the 3rd Generation Partnership Project (3GPP) Femto system but the concept is applicable to all standards.

The home base station installation is done by the customers most of whom are non-technical people. The installation process must be straightforward and automatic. Even then the operator needs to have some means of technical support just to tell which wires are plugged where. There might be different device types connecting either to Ethernet or with an integrated DSL or cable modem (this connection may be referred to as a backhaul connection). When plugged into the customer's electric outlet and internet connection, the home base station needs to first determine the correct settings for the backhaul connection. Preferably DHCP or some other means of automatic negotiation is used to get the IP and DNS settings. When these settings are set and a secure backhaul connection is working between a secure gateway and the home base station, the home base station needs to be authenticated by a secure network gateway and/or some specific authentication entity on the network side.

An authentication of a home base station may be based on an identity received from the home base station. However, there may be alternative identities that the home base station may use for authentication, e.g. depending on the authentication performed. For example, the home base station may be primarily authenticated by a Device Authentication wherein a device identity (ID) of the home base station is used. It is a mutual authentication between the home base station device and the operator's network. Each home base station is provided with a unique device identity.

Alternatively or following to the device authentication, the home base station may be authenticated by a user authentication wherein a user identity (ID), such as IMSI (International Mobile Subscriber Identity) is used. An example of a user authentication is a Hosting Party Authentication. The Hosting Party of the home base station means the party who is hosting the home base station and has a contractual relationship with the PLMN operator. The hosting party of the home base station will typically be the "lead" user in a household, but could be e.g. the corporate IT manager in an enterprise context. For this purpose, the home base station may support identification and authentication of the hosting party by means of a Subscriber Identity Module (SIM) or a Universal SIM (USIM). The USIM/SIM card may be used in a home base station device similar to a mobile phone. In both the device authentication and the user/hosting party authentication a secure connection or tunnel is established between the home base station and the security gateway in case of a successful authentication.

When the home base station is functioning as a part of the network, a home base station management system is used to remotely change configurations, perform software updates and manage the general Operations, Administration and Management (OAM) tasks, such as monitoring for faults and performance. After a successful authentication, the home base station management system sends the configuration data to the home base station and manages the base station over a secured management connection. In the case the management system is inside the network operator's core network, the secure management connection may be using the secure connection between the security gateway and the home base station. In that case no mutual OAM authentication may be performed between the home base station and the management system but the management system relies on the authentication performed by the security gateway. In other words, if the identity of the home base station is sent to the management system via the security gateway, then the management system may trust that a device authentication and/or hosting party authentication were successful and that the received identity can be accepted and the configuration data can be sent. The received identity can be e.g. the device ID, the IMSI, both or another unique ID. However, the management system may not be able to unambiguously derive which identity for the home base station is used for OAM after performing successful authentication. Moreover, part of the configuration data is subscriber/user related when a USIM/SIM card is used, and this USIM/SIM card can be used in any home base station device. Here the problem is, no matter which identity is used, from the OAM point of view how to obtain the correct configuration data for one home base station. Furthermore, the configuration data which are related to user and USIM/SIM card maybe stored on the device and not on the SIM/USIM card and HP Authentication process doesn't check whether the USIM/SIM card is plugged into the same device or a physically different device.

SUMMARY OF THE INVENTION

An object of the present invention is to provide a more effective management of configuration data for femtocell access points. The object of the invention is achieved by a method and apparatuses recited in the independent claims. Embodiments of the invention are disclosed in the dependent claims.

An aspect of the invention is a method for managing femto access points in a femto management system of a mobile communications network, comprising storing configuration data for a plurality of femto access points connected to the mobile communications network, classifying the configuration data into device-related configuration data, which are indexed by device identity, and into subscriber/user-related configuration data, which are indexed by subscriber/user identity, setting up, after a successful authentication of a femto access point to the mobile communications network, a binding relationship between a device identity of a device part of the authenticated femto access point and a subscriber/user identity of a subscriber identity module inserted into the device part of the femto access point, generating complete configuration data for the authenticated femto access point, which complete configuration data contain device-related configuration data and subscriber/user-related configuration data selected from the classified configuration data based on the setup binding relationship of device and subscriber/user identities of the authenticated femto access point, and sending the generated complete configuration data to the authenticated femto access point.

According to a further aspect of the invention the method comprises receiving an identity of the femto access point after the successful authentication to the mobile communications network, the identity of the authenticated femto access point being one of the following, depending on the settings in the mobile communications network: device identity of a device part of the femto access point, a subscriber/user identity of a subscriber identity module inserted into the device part of the femto access point, combination of the device identity and the subscriber/user identity, or another unique ID, and obtaining, during registration of the authenticated femto access point with the femto management system, the one or ones of the device-identity and the subscriber/user identity that is or are not derivable from the received identity of the authenticated femto access point.

According to a further aspect of the invention the method comprises receiving an identity of the femto access point after the successful authentication to the mobile communications network, the identity of the authenticated femto access point being a device identity of a device part of the authenticated femto access point, receiving, during registration of the authenticated femto access point with the femto management system, a subscriber/user identity of a subscriber identity module inserted into the device part of the authenticated femto access point, setting up the binding relationship based on the received identity of the authenticated femto access point and the received subscriber/user identity.

According to a further aspect of the invention the method comprises receiving an identity of the femto access point after the successful authentication to the mobile communications network, the identity of the authenticated femto access point being a subscriber/user identity of a subscriber identity module inserted into a device part of the authenticated femto access point, receiving, during registration of the authenticated femto access point with the femto management system, a device identity of the device part of the authenticated femto access point, and setting up the binding relationship based on the received identity of the authenticated femto access point and the received device identity.

According to a further aspect of the invention the method comprises receiving an identity of the femto access point after the successful authentication to the mobile communications network, the identity of the authenticated femto access point being a combination of a device identity of a device part of the authenticated femto access point and a subscriber/user identity of a subscriber identity module inserted into the device part of the authenticated femto access point, setting up the binding relationship based on the received identity of the authenticated femto access point.

According to a further aspect of the invention the method comprises receiving the identity of the authenticated femto access point—via a security gateway which authenticated the femto access point, the security gateway having a secure connection to the authenticated femto access point.

According to a further aspect of the invention the method comprises setting up a management connection to the authenticated femto access point via the security gateway and the secure connection.

According to a further aspect of the invention the method comprises receiving, at a time after sending the generated complete configuration data, a notification about the subscriber identity module originally inserted into the device part of the authenticated femto access point being re-placed by a new subscriber identity module, receiving a user/subscriber identity of the new subscriber identity module, setting up a new binding relationship between the device identity of the device part of the authenticated femto access point and the subscriber/user identity of the new subscriber identity module inserted into the device part of the femto access point, re-generating new complete configuration data for the authenticated femto access point, which complete configuration data contains device-related configuration and data subscriber/user-related configuration data selected from the classified configuration data based on the setup binding relationship of the device identity and the subscriber/user identity of the new subscriber/user module of the authenticated femto access point, and sending all or part of the re-generated new complete configuration data to the authenticated femto access point.

According to a further aspect of the invention the method comprises sending the part of the re-generated new complete configuration data which is selected from the classified configuration data based on the subscriber/user identity of the new subscriber identity module.

According to a further aspect of the invention the authentication comprises a device authentication and/or a hosting party authentication.

According to a further aspect of the invention the subscriber/user identity is an international mobile subscriber identity, IMSI.

A still further aspect of the invention is a computer program comprising program code means adapted to perform any of the method aspects disclosed above when the program is run on a computer.

A still further aspect of the invention is a computer-readable medium having stored thereon a computer, comprising program code adapted to perform any of the method aspects disclosed above when the program is run on a computer.

A still further aspect of the invention is an apparatus, comprising a processor device and an associated data storage device that includes a computer program configured to cause the processor device to implement any of the method aspects disclosed above when the program is run on a processor.

A still further aspect of the invention is a femto management apparatus, comprising means for implementing any of the method aspects disclosed above.

BRIEF DESCRIPTION OF THE DRAWINGS

In the following the invention will be described in greater detail by means of exemplary embodiments with reference to the attached drawings, in which.

DESCRIPTION OF EXEMPLARY EMBODIMENTS

In the following the invention is described with exemplary embodiments in which the 3GPP Femto system is used but the invention is not intended to be limited to the 3GPP Femto. To the contrary, Femto related topics are widely and deeply discussed in different standardization organizations, e.g. Femto Forum, Broadband Forum, 3GPP, WiMAX Forum and so on. The management principles according to the present invention can be used for all other Femto related technologies, e.g. WiMAX Femto system, LTE Femto system, Femto/Self Organising Network (SON), etc., as a general solution to bind a femto access point device and a subscriber identity module, such as an USIM/SIM card.

The term femto access point (FAP), or "Femtocell" in general, as used herein refers to any femto related access point, such as any Fixed Access Point, Home Base station, Home Node B, etc.

Typically, femto access point is a small-scale cellular base station designed specifically for indoor coverage. As such, it may communicate to the user's mobile handset over the standard-based radio interface using licensed spectrum and further connects to the mobile network infrastructure over the fixed broadband connection.

The 3rd Generation Partnership Project (3GPP) is setting the standards on the 3G Femto. 3GPP standards introduce new network elements, such as the Home NodeB (HNB) or Home eNodeB (HeNB), and the Home NodeB Gateway (HNB-GW) or the Home eNodeB Gateway (HeNB-GW), and a new interface (Iu-h, S1) between them. Also logical elements Security Gateway (SecGW) and HNB Management System (HMS) or HeNB Management System (HeMS) are specified. Access to 3G and evolved packet system (EPS) services may be provided via UTRAN or E-UTRAN home base stations. In case of UTRAN, names HNB, HNB-GW, and HMS are typically used, whereas in case of E-UTRAN, names HeNB, HeNB-GW, and HeMS are typically used. For simplicity of the description, these network elements of the two access types are jointly referred to as H(e)NB, H(e)NB-GW, and H(e)MS herein.

Figure 1:
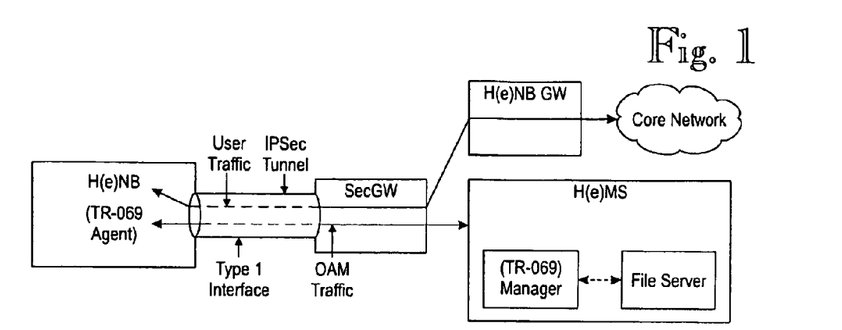
FIG. 1 illustrates an example of the general architecture of a 3GPP Femto system.

FIG. 1 illustrates the general architecture of a 3GPP Femto system, including 3G Femto system and LTE Femto system. Take 3G Femto system as example, the Home NodeB, i.e. HNB, is a device that can be installed to the user premises, e.g. to the user's home or office to the location he/she chooses, to serve as a femtocell access point. The operator has no exact control of the location. The HNB may be powered from the user's electric network using most likely an external power adapter. The customers' existing broadband internet connections (such as DSL, Ethernet or cable) may be used as backhaul connections to the service provider's network. The HNB may be able, to operate with several, e.g. 4 to 8, existing 3G user equipments UE and offer them the same services as if they were operating under a regular NodeB. The Home NodeB Gateway, i.e. HNB-GW, is the device used to connect the HNBs to the 3G network. It's needed because it has been agreed not to use the standard Iu-b interface for the connection to the HNB. The HNB-GW concentrates connections from a large amount of femtocells. The new Iu-h interface is used between HNB and HNB-GW. HNB-GW is connected to the CN using the standard Iu interface and the network sees it as a standard RNC. The HNB-GW can be located anywhere at the operators premises. It should be noted that for the LTE the HeNB-GW is an optional NE.

The Iu-h is the interface between the HNB and HNB-GW. The Iu-h interface may be tunneled over the residential internet connection of the customer and over the public internet. In other words, the backhaul link used between HNB and SecGW provides a secure tunnel carrying both the user plane data and the control plane data that are transmitted between the HNB and network elements in the core network. The Iu-h interface provides transport for the control and user plane messages. RANAP user adaptation (RUA) is used over Iu-h to provide transparent transfer for the RANAP messages and another control plane protocol called the Home NodeB Application Protocol (HNBAP) is as well introduced. HNBAP is used to carry the HNB specific control information between the HNB and HNB-GW. Transparent transport is also provided for the Iu user plane protocol layer, which is terminated at the core network, not at the HNB-GW. All this may be carried over an encrypted IPsec tunnel. It should be noted that for the LTE the H(e)NB uses S1 interface and not Iu-h, The Security Gateway (SecGW) is a logical element which can be physically implemented separately or as an integrated solution with the HNB-GW. The SecGW may terminate the IPSec tunnels for TR-069 and Iu-h protocols and act as a firewall between the operator's core network elements and the public internet. The SecGW represents operator's core network to perform mutual authentication with HNB and it provides access to HMS and HNB-GW. The Home NodeB Management System, i.e. HMS, may use an interface based on the TR-069 standards widely used in DSL modem and DVB set-top-box management and updates. The management system may send the configuration data to the HNB and help the HNB in HNB-GW and SecGW discovery. It may also initiate HNB software updates and perform HNB location verification. The interface between the H(e)NB and the H(e)MS is TR-069. The H(e)MS may comprise a TR-069 manager and a file server. The TR069 manager implements the Auto-Configuration Server function as defined in TR-069 standard and performs CM, FM and PM functionalities to the H(e)NB. The file server may be used for file upload or download, as instructed by TR-069 manager. The H(e)MS is referred to as ACS (Automated Configuration Server) by some organisations, such as Femto Forum and Broadband Forum.

The H(e)NB architecture and the elements differ from the standard UTRAN and E-UTRAN configuration, and so does their functionality too. The things usually handled by the NodeB are now divided between the HNB and HNB-GW. The functional split between the devices is specified in the Release 8 TS 25.467 which specifies the UTRAN architecture.

Because the H(e)NB itself is the part which actually contains the radio and is located near the user, it has main responsibility on radio resource and RAB management tasks. The H(e)NB is in charge of the admission control and together with the CN it manages the RAB establishments, modifications and releases. Security functions on the air interface, like ciphering, are also managed by the H(e)NB with CN managing the key.

Several types of interfaces have been specified between H(e)NB and H(e)MS. FIG. 1 illustrates H(e)MS and the H(e)NB management over Type 1 interface between H(e)NB and H(e)MS, and the exemplary embodiments of the invention will be described in this context. The H(e)NB GW is not relevant to the present invention.

As specified, TR-069 protocol is used between H(e)NB and H(e)MS to support management functionalities, i.e. TR-069 will be reused for 3G Femto and LTE Femto. Furthermore, TR-069 is also applicable to WiMAX Femto and may be used by further Femto technologies as well.

Furthermore, as one of the requirement, H(e)NB architecture allows to operate the H(e)MS inside the operator's core network (i.e. TR-069 CWMP based connection using the IPSec tunnel between SecGW and H(e)NB) or outside the operator's core network (i.e. TR-069 CWMP based connection between H(e)NB and H(e)MS using the Internet).

Figure 2:
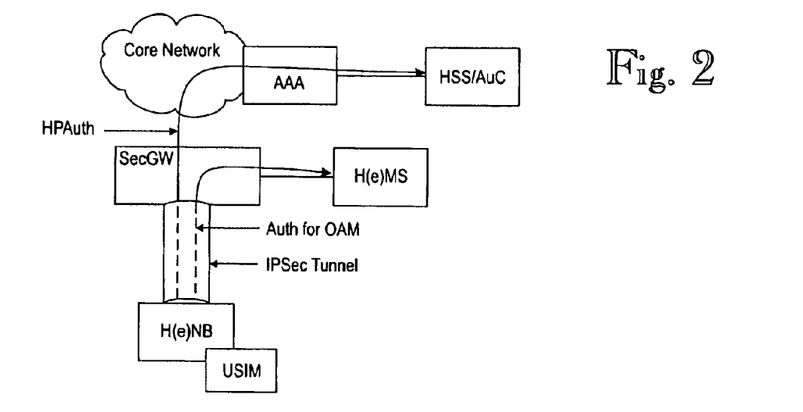
FIG. 2 illustrates an example of Hosting Party authentication and the relation to OAM authentication when the H(e)MS is inside the operator's core network and a USIM/SIM card is used in the H(e)NB.

As noted above, the H(e)NB may be authenticated by the SecGW based on a globally unique and permanent H(e)NB identity. In the latest version of TS 22.220, H(e)NB Hosting Party concept is introduced which means that HP has a contractual relationship with the operator. Accordingly, in the latest version of TS 33.320, Hosting Party (HP) Authentication has been specified, which means that the H(e)NB may support identification and authentication of the H(e)NB Hosting Party by means of a USIM/SIM application. HP Authentication is optionally supported by operators, i.e. certificate-based Device Authentication may optionally be followed with an EAP-AKA-based Hosting Party Authentication exchange between H(e)NB and the AAA (Authentication, Authorization and Accounting) server. The HSS (Home Subscriber Server) stores the subscription data and authentication information of the H(e)NBs. The AAA server authenticates the hosting party based on the authentication information retrieved from the HSS when hosting party authentication is per-formed. Both Device Authentication and Hosting Party Authentication use IKEv2 protocol to establish the IPSec tunnel between H(e)NB and SecGW in case of successful authentication. Furthermore, the USIM/SIM card can be used in any femto device similar to a mobile phone. The different authentication options and the different alternative identities raise problems in the OAM point of view. Examples of these problems will be explained referring to FIG. 2 which shows the scenario that H(e)MS is inside the operator's core network and a USIM/SIM card is used in the H(e)NB. As noted above, when the H(e)MS is inside the operator's core network and a TR-069 CWMP based connection using the IPSec tunnel between the H(e)NB and the SecGW is used, the OAM authentication between the H(e)NB and the H(e)MS may be replaced by the authentication between the H(e)NB and the SecGW. Let us assume that, e.g. as specified in TS 33.320, a HP Authentication between the H(e)NB and the SecGW was performed successfully when the IPSec tunnel was established, i.e. the H(e)MS can rely on the received data from the H(e)NB. This includes also that the H(e)MS can rely on the H(e)NB identity (e.g. DeviceID, IMSI or some other unique id, such as MAC address, used for OAM)) received from the H(e)NB. In general, a Mobile Network Operator (MNO) may identify a subscriber via his/her USIM/SIM card. An advantage of this method is that the subscriber can use any H(e)NB device. The subscriber only has to plug-in his/her USIM/SIM card to the H(e)NB device. The problem is from the OAM point of view how to obtain the correct configuration data for the H(e)NB, because:

there is no binding between device and USIM/SIM card defined moreover, part of the configuration data is subscriber/user related (e.g. Closed Subscriber Group membership), while the other part of the configuration data is device/H(e)NB related furthermore, the configuration data which are related to the user and the USIM/SIM card are stored on the device and not on the USIM/SIM card No binding between the H(e)NB device and the USIM/SIM card means that the HP Authentication process used to establish the IPSec tunnel between SecGW and H(e)NB does not check if the USIM/SIM card is plugged into the same H(e)NB device or a physically different H(e)NB device. It is also not checked if an USIM/SIM card is plugged out and replaced by a card of another user who belongs to the same Operator Network. As a result, the OAM Management System (H(e)MS) is not able to configure the H(e)NB properly when Hosting Party authentication is used.

Figure 4:
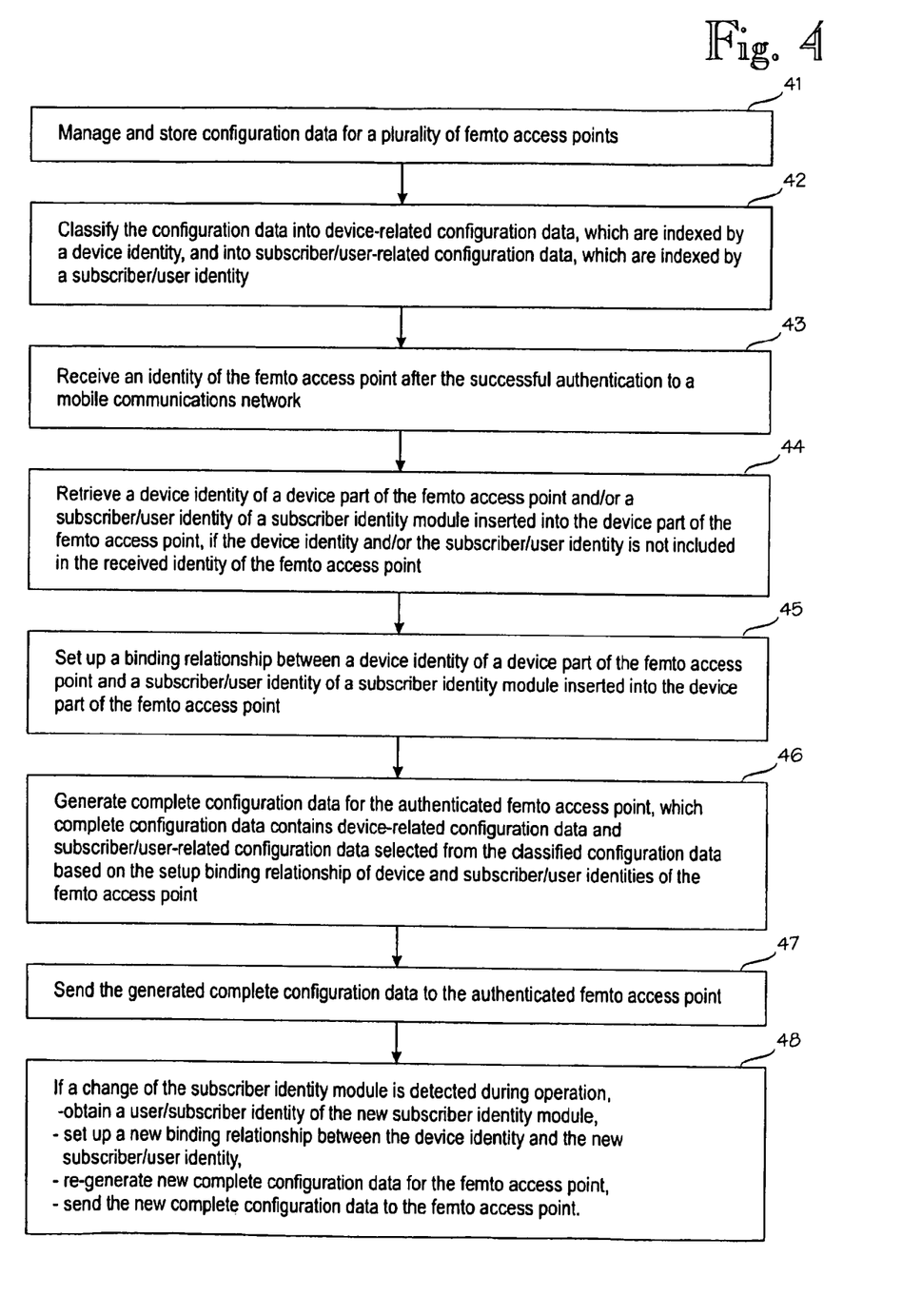
FIG. 4 is a flow diagram illustrating an example of the operation of the H(e)MS according to an embodiment of the invention.

According to a first aspect of the present invention the configuration data stored in the H(e)MS is classified into two types: a) Device-related configuration data, which are indexed by DeviceID; and b) Subscriber/User-related configuration data, which are indexed by IMSI (steps 41 and 42 in FIG. 4). The H(e)MS also wishes to bind the USIM/SIM card and the device. To this end, a binding relationship between the IMSI (the subscriber/user identity of the USIM/SIM) and DeviceID of H(e)NB is setup in the H(e)MS (step 45 in FIG. 4). The H(e)MS generates the H(e)NB's full configuration data based on the combination of the binded IMSI and DeviceID. In other words, the full configuration data contains device-related configuration data selected from the classified configuration data based on the binded DeviceID of the H(e)NB, and user-related configuration data selected from the classified configuration data based on the bound IMSI of the H(e)NB (step 46 in FIG. 4). The H(e)MS then sends this full configuration data to the H(e)NB (step 47 in FIG. 4).

Embodiments of the present invention provide a simple method to setup/re-setup the binding relationship between USIM/SIM card and femto device on the H(e)MS even if the relationship is changed. The binding is used to generate a definition for the common subset between device features and subscribed features. Only combination of both allows providing correct configuration. There is no need to distinguish whether the data are stored in the SIM/USIM or in the device part. When a USIM/SIM card is used for a different device, only a part of configuration data (i.e. subscriber-related data) needs to be reconfigured on the H(e)NB. The H(e)NB identity can be DeviceID or IMSI or the combination of DeviceID and IMSI, which are all possible to femto system.

Furthermore, besides the above identity definition, the H(e)NB identity could be any ID used for OAM (e.g. MAC address). Which kind of H(e)NB identity is used in each specific mobile network is decided by the network operator. A device identity as defined in TR-069 consists of following information: Manufacturer, OUI, ProductClass and Serial Number. The combination of OUI, ProductClass and Serial Number may be considered as a unique Id. In the case of HP authentication it is also possible to use a simplified index, e.g. OUI and Product Class to identify the device related config data. However, the present invention is not limited to a use of any unique ID. To the contrary, the above-mentioned DeviceID, IMSI and combination of both can be replaced with any unique ID (e.g. MAC address) used to identify the device or the USIM for management tasks.

Figure 3:
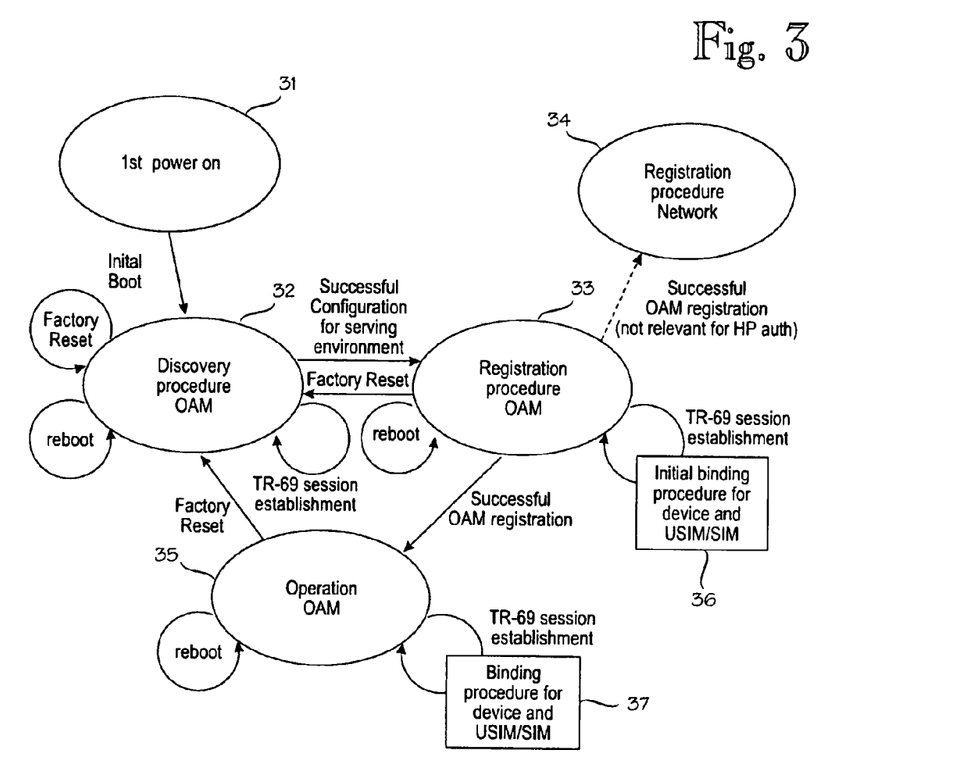
FIG. 3 is a diagram illustrating various procedures performed after power up of a H(e)NB and during operation.

OAM procedures where aspects of the present invention are applied are now illustrated referring to FIG. 3. Firstly, when the H(e)NB is powered up first time (31), it performs first an OAM discovery procedure 32. An OAM Registration procedure 33 to the H(e)MS is performed after the discovery procedure 32 and will not be repeated after it was successful, i.e. it is performed only once. After a successful OAM registration 33 the H(e)NB performs a registration 34 to the network (e.g. to the HNB-GW in case of 3G Femto and to the MME in case of LTE Femto). The network registration procedure 34 is not relevant for the Hosting Party (HP) authentication. According to exemplary embodiments of the invention, during the OAM registration procedure 33a (temporary) binding 36 for the H(e)NB device and the USIM/SIM will be performed initially. If the OAM registration process 33 is not completed successfully, the initial binding 36 will be deleted. During a successful OAM registration 33, the H(e)MS generates the H(e)NB's full configuration data based on the binding. In other words, the full configuration data contains device-related configuration data and user-related configuration data selected from the classified configuration data based on the binding. The H(e)MS then sends this full configuration data to the H(e)NB and thereby configures the H(e)NB for the serving environment. After the successful OAM registration the H(e)MS transits to an OAM Operation OAM phase 35, wherein it performs OAM procedures needed for the H(e)NB in the registered state, i.e. during the operation. In embodiments of the invention, the H(e)MS may be configured to detect an USIM/SIM change at a H(e)NB device in the OAM Operation phase, and perform a new binding procedure 37 for the H(e)NB device and the USIM/SIM. As illustrated in the example shown in FIG. 3, an initial binding 36 of the USIM/SIM card and the H(e)NB device may be performed during the OAM registration procedure 33 at H(e)MS to get a network wide unique identity. The H(e)MS generates for this unique identity the full H(e)NB's configuration data based on the combination of device related and subscriber related data.

In the following, an exemplary scenario is illustrated wherein the H(e)MS receives the H(e)NB identity after a successful Hosting Party authentication (step 43 in FIG. 4). The H(e)NB identity could be the DeviceID, the IMSI or the combination of DeviceID and IMSI, for example. If one or both of the DeviceID and the IMSI is not included in the H(e)NB identity, the missing identity/identities may be retrieved from the H(e)NB (step 44 in FIG. 4). Thus, the binding methods in the procedure 36 may be different based on which kind of H(e)NB identity is used:

a) If the received H(e)NB identity=DeviceID, the H(e)MS may read the IMSI from the H(e)NB (e.g. via a RPC GetParameterValue) and bind it with the DeviceID and the H(e)NB data model
b) If the received H(e)NB identity=IMSI, the H(e)MS may read the DeviceID from the H(e)NB (e.g. via a RPC GetParameterValue) and bind it with the IMSI and the H(e)NB data model
c) If the received H(e)NB identity=DeviceID+IMSI, the H(e)MS can setup the binding relationship based on the received H(e)NB identity and the H(e)NB data model.

In the following, two alternative embodiments are illustrated as examples of ways to detect an USIM/SIM change at a device in the OAM Operation phase.

In first exemplary embodiment, an USIM/SIM change during the connection setup is detected at the H(e)MS. More specifically, after the binding relationship between USIM/SIM card and device for a H(e)NB has been initially setup at the H(e)MS, the H(e)MS may check for every subsequent connection setup the binding relation. If the DeviceID and IMSI are not changed, the present binding relation is accepted. If the H(e)MS detects a change, it is necessary to perform a re-configuration of this H(e)NB, and after a successful reconfiguration, the new binding of the changed DeviceID and IMSI will be performed and stored 37 (step 48 in FIG. 4).

The second exemplary embodiment allows to derive the H(e)NB identity from IMSI or DeviceID and to detect changes via supervision of the USIM/SIM card at the H(e)NB. More specifically, after the initial binding relationship between the USIM/SIM card and the H(e)NB device has been setup, the H(e)NB may supervise the change of the IMSI (i.e. a new USIM/SIM card is plugged in) and may report any such change to the H(e)MS. If H(e)MS receives the change message (e.g. RPC Inform method) it is necessary to perform a re-configuration of this H(e)NB, and after successful reconfiguration the new binding of the changed DeviceID and IMSI will be performed and stored 37 (step 48 in FIG. 4).

In embodiments of the invention the H(e)MS may start a reconfiguration via a factory reset or via a configuration procedure as defined in TS 32.583/TS 32.593. The binding of IMSI and DeviceID at the H(e)MS may be stored permanently or on a temporary basis. "Temporary" storing may mean that the configuration data are stored for the bound IMSI and DeviceID, and if a change of the USIM/SIM at a H(e)NB device is detected, the associated configuration may be deleted at the H(e)MS directly or according to rules defined by the Network Operator. As mentioned above, in embodiments where the H(e)NB does not detect or report in operation an USIM/SIM change, the binding check may need to be performed with every TR-069 session establishment. If the H(e)NB reboots the H(e)NB after an USIM/SIM change, the binding check may be limited to a TR-069 session establishment with an RPC method inform and event >>boot<<. If the H(e)NB reports an USIM/SIM change, the binding check may be performed only after the H(e)MS receives the Inform message that reports the USIM/SIM change.

Figure 5:
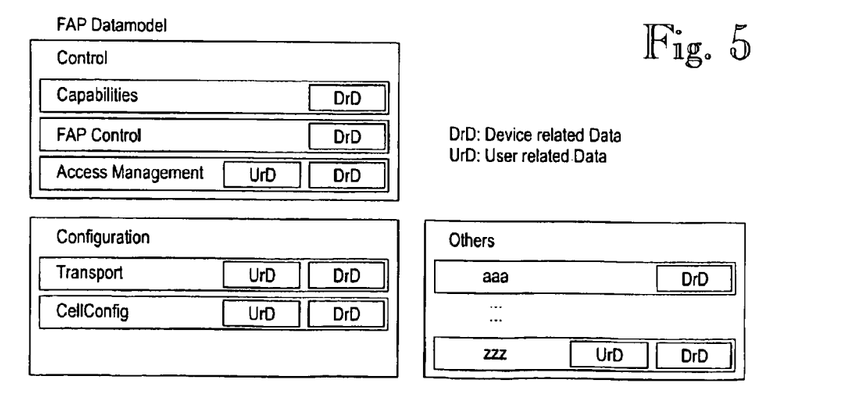
FIG. 5 illustrates an example of the internal structure of a data model for a Femto Access Point (FAP) for the remote management purposes.

FIG. 5 illustrates an example of the internal structure of a data model, modified in accordance with principles of the present invention, for a Femto Access Point (FAP) for the remote management purpose using the TR-069 CWMP. This FAP Data Model is UMTS FDD Home NodeB (i.e. "3G HNB"). However, the structure and organization of the Data Model can be extended to cover other type(s) of FAP device based on other radio interface technologies. The configuration data are labelled in the FIG. 5 with "Configuration" and "Control" and "Others". The configuration data are classified into device related data (DrD) and user related data (UrD) in accordance with principles of the present invention.

The techniques described herein may be implemented by various means so that an apparatus implementing one or more functions bf a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

While particular example embodiments according to the invention have been illustrated and described above, it will be clear that the invention can take a variety of forms and embodiments within the spirit and scope of the appended claims.

The invention claimed is:

1. A method for managing femto access points in a femto management system of a mobile communications network, comprising
   storing configuration data for a plurality of femto access points connected to the mobile communications network,
   classifying the configuration data into device-related configuration data, which are indexed by device identity, and into subscriber/user-related configuration data, which are indexed by subscriber/user identity,
   setting up, after a successful authentication of a femto access point to the mobile communications network, a binding relationship between a device identity of a device part of the authenticated femto access point and a subscriber/user identity of a subscriber identity module inserted into the device part of the femto access point,
   generating complete configuration data for the authenticated femto access point, which complete configuration data contains device-related configuration data and subscriber/user-related configuration data selected from the classified configuration data based on the setup binding relationship of device and subscriber/user identities of the authenticated femto access point, and
   sending the generated complete configuration data to the authenticated femto access point.

2. The method according to claim 1, comprising
   receiving an identity of the femto access point after the successful authentication to the mobile communications network, the identity of the authenticated femto access point being one of the following, depending on the settings in the mobile communications network: device identity of a device part of the femto access point, a subscriber/user identity of a subscriber identity module inserted into the device part of the femto access point, combination of the device identity and the subscriber/user identity, or another ID, and
   obtaining, during registration of the authenticated femto access point with the femto management system, the one or ones of the device identity and the subscriber/user identity that is or are not derivable from the received identity of the authenticated femto access point.

3. The method according to claim 1, comprising
   receiving an identity of the femto access point after the successful authentication to the mobile communications network, the identity of the authenticated femto access point being a device identity of a device part of the authenticated femto access point,
   receiving, during registration of the authenticated femto access point with the femto management system, a subscriber/user identity of a subscriber identity module inserted into the device part of the authenticated femto access point,
   setting up the binding relationship based on the received identity of the authenticated femto access point and the received subscriber/user identity.

4. The method according to claim 1, comprising
   receiving an identity of the femto access point after the successful authentication to the mobile communications network, the identity of the authenticated femto access point being a subscriber/user identity of a subscriber identity module inserted into a device part of the authenticated femto access point,
   receiving, during registration of the authenticated femto access point with the femto management system, a device identity of the device part of the authenticated femto access point, and
   setting up the binding relationship based on the received identity of the authenticated femto access point and the received device identity.

5. The method according to claim 1, comprising
   receiving an identity of the femto access point after the successful authentication to the mobile communications network, the identity of the authenticated femto access point being a combination of a device identity of a device part of the authenticated femto access point and a subscriber/user identity of a subscriber identity module inserted into the device part of the authenticated femto access point,
   setting up the binding relationship based on the received identity of the authenticated femto access point.

6. The method according to claim 1, comprising
   receiving an identity of the femto access point after the successful authentication to the mobile communications network, the identity of the authenticated femto access point being an unique serial number,
   receiving, during registration of the authenticated femto access point with the femto management system, a device identity of the device part of the authenticated femto access point and a subscriber/user identity of a subscriber identity module inserted into the device part of the authenticated femto access point,
   setting up the binding relationship based on the received device identity and the received subscriber/user identity.

7. The method according to claim 1, comprising
   receiving the identity of the authenticated femto access point via a security gateway which authenticated the femto access point, the security gateway having a secure connection to the authenticated femto access point,
   setting up a management connection to the authenticated femto access point via the security gateway and the secure connection.

8. The method according to claim 1, comprising
   receiving, at a time after sending the generated complete configuration data, a notification about the subscriber identity module originally inserted into the device part of the authenticated femto access point being replaced by a new subscriber identity module, receiving a user/subscriber identity of the new subscriber identity module, setting up a new binding relationship between the device identity of the device part of the authenticated femto access point and the subscriber/user identity of the new subscriber identity module inserted into the device part of the femto access point, re-generating new complete configuration data for the authenticated femto access point, which complete configuration data contains device-related configuration and data subscriber/user-related configuration data selected from the classified configuration data based on the setup binding relationship of the device identity and the subscriber/user identity of the new subscriber/user module of the authenticated femto access point, and sending all or part of the re-generated new complete configuration data to the authenticated femto access point.

9. The method according to claim 1, comprising checking, at each subsequent connection setup, whether the subscriber identity module originally inserted into the device part of the authenticated femto access point has been replaced by a new subscriber identity module, receiving a user/subscriber identity of the new subscriber identity module, setting up a new binding relationship between the device identity of the device part of the authenticated femto access point and the subscriber/user identity of the new subscriber identity module inserted into the device part of the femto access point, re-generating new complete configuration data for the authenticated femto access point, which complete configuration data contains device-related configuration and data subscriber/user-related configuration data selected from the classified configuration data based on the setup binding relationship of the device identity and the subscriber/user identity of the new subscriber/user module of the authenticated femto access point, and sending all or part of the re-generated new complete configuration data to the authenticated femto access point.

10. The method according to claim 8, comprising sending the part of the re-generated new complete configuration data which is selected from the classified configuration data based on the sub-scriber/user identity of the new subscriber identity module.

11. The method according to claim 1, wherein the authentication comprises a device authentication and/or a hosting party authentication.

12. The method according to claim 1, wherein the subscriber/user identity is an international mobile subscriber identity, IMSI.

13. A computer program product embodied on a non-transitory computer-readable medium, the computer program product configured to control a processor to perform the method according to claim 1 when the computer program product is run on a computer.

14. A non-transitory computer-readable medium having stored thereon a program, comprising program code adapted to perform the method according to claim 1 when the program is run on a computer.

15. An apparatus, comprising a processor device and an associated data storage device that includes a computer program configured to cause the processor device to implement the method according to claim 1 when the program is run on the processor device.

16. A femto management apparatus, comprising storing means for storing configuration data for a plurality of femto access points connected to the mobile communications network, classifying means for classifying the configuration data into device-related configuration data, which are indexed by device identity, and into subscriber/user-related configuration data, which are indexed by subscriber/user identity, setting means for setting up, after a successful authentication of a femto access point to the mobile communications network, a binding relationship between a device identity of a device part of the authenticated femto access point and a subscriber/user identity of a subscriber identity module inserted into the device part of the femto access point, generating means for generating complete configuration data for the authenticated femto access point, which complete configuration data contains device-related configuration data and subscriber/user-related configuration data selected from the classified configuration data based on the setup binding relationship of device and subscriber/user identities of the authenticated femto access point, and sending means for sending the generated complete configuration data to the authenticated femto access point.

* * * * *